(12) United States Patent
Nassouri et al.

(10) Patent No.: US 8,532,892 B2
(45) Date of Patent: Sep. 10, 2013

(54) METHOD AND SYSTEM FOR DETERMINING AN ACCUMULATOR PRE-CHARGE PRESSURE IN A FLUID CIRCUIT

(75) Inventors: Crystal Nassouri, West Bloomfield, MI (US); Mark A. Schang, Milford, MI (US); Stephen Lewis Pudvay, Howell, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 13/348,104

(22) Filed: Jan. 11, 2012

(65) Prior Publication Data

US 2013/0179046 A1    Jul. 11, 2013

(51) Int. Cl.
*B60T 11/21* (2006.01)
*B60T 11/24* (2006.01)

(52) U.S. Cl.
USPC ............. 701/60; 701/51; 701/61; 701/78; 180/307; 180/367

(58) Field of Classification Search
USPC ............ 701/51, 60–63, 78, 83–92, 102–109; 340/450, 450.1, 451–453; 180/242, 305, 180/307, 367; 903/915
See application file for complete search history.

(56) References Cited

U.S. PATENT DOCUMENTS

| | | | | |
|---|---|---|---|---|
| 5,911,682 A * | 6/1999 | Kato et al. | | 60/276 |
| 6,029,641 A * | 2/2000 | Suzuki et al. | | 123/673 |
| 6,125,321 A * | 9/2000 | Tabata et al. | | 701/97 |
| 7,457,785 B1 * | 11/2008 | Greitzer et al. | | 706/12 |
| 8,126,632 B2 * | 2/2012 | Pallett et al. | | 701/103 |
| 8,131,446 B2 * | 3/2012 | Pallett et al. | | 701/103 |
| 2010/0088010 A1 * | 4/2010 | Verdejo et al. | | 701/105 |

* cited by examiner

*Primary Examiner* — Mary Cheung
*Assistant Examiner* — Atul Trivedi
(74) *Attorney, Agent, or Firm* — Quinn Law Group, PLLC

(57) ABSTRACT

A system includes a pump, accumulator, a sensor which measures line pressure in a fluid circuit, and a controller. The controller plots and calculates respective slopes of first and second sets of measured pressure values from the sensor, calculates a slope ratio, and compares the slope ratio to a threshold. The controller also records the pre-charge pressure as the point of intersection of lines representing the slopes when the ratio exceeds the threshold. A control action is executed when the pre-charge pressure drops below a calibrated minimum threshold. A method includes measuring the pressure values, calculating the respective slopes and the slope ratio, comparing the slope ratio to a ratio threshold, recording the point of intersection of lines representing the slopes as an interpolated pre-charge pressure value when the ratio exceeds the threshold, and executing the control action.

17 Claims, 3 Drawing Sheets

US 8,532,892 B2

METHOD AND SYSTEM FOR DETERMINING AN ACCUMULATOR PRE-CHARGE PRESSURE IN A FLUID CIRCUIT

TECHNICAL FIELD

The present disclosure relates to the control of a hydraulic fluid circuit, and in particular to the determination of an accumulator pre-charge pressure in such a circuit.

BACKGROUND

Hydraulic fluid circuits use a host of fluid powered components to perform work within a system. Pressure within the fluid circuit is provided via a fluid pump. Supplemental fluid pressure may be provided by a hydraulic accumulator. The accumulator acts as a standby energy storage device, typically in the form of a pressure storage reservoir. Hydropneumatic accumulators in particular are charged when fluid pressure in the circuit moves a piston within a cylinder. Movement of the piston compresses a volume of inert gas within the cylinder, thus allowing oil to flow into the accumulator.

When a fluid pump is turned on, fluid is delivered under pressure to all open branches of the fluid circuit. The accumulator piston begins to compress the charging gas once the various fluid passages of the circuit have completely filled with oil. When the fluid pressure in the circuit overcomes drag of the piston seal on the cylinder wall, the piston will begin to move in its compression stroke. Just before such movement begins, the gas pressure in the accumulator is at equilibrium with fluid pressure in the circuit. This pressure point is known as the accumulator pre-charge pressure.

SUMMARY

A system is disclosed herein having a fluid circuit and a controller. The circuit includes a pump, a pressure sensor, and an accumulator. The controller is in communication with the sensor, and is programmed or otherwise configured to precisely identify the pre-charge pressure of the accumulator. The volume of fluid held in the accumulator can be determined as a function of the pre-charge pressure, with the volume thereafter used as a control input in the overall control of the fluid circuit. In an example embodiment, the system may be a vehicle having a transmission, with the fluid circuit providing line pressure to a fluid powered component of the transmission.

The pre-charge pressure of an accumulator may change over time as the accumulator ages and its piston seal degrades. As a result, the accumulator may hold different volumes of oil at different times even if the line pressure remains substantially unchanged. The present approach is therefore directed toward accurately identifying the pre-charge pressure so that control over the operation of the fluid circuit may be effectively maintained over time using accurate, up to date volumetric data.

Within the fluid circuit, a pressure sensor is positioned with respect to the accumulator to measure such line pressure. The controller includes a tangible, non-transitory memory on which instructions are recorded for determining the pre-charge pressure, and a processor which selectively executes the instructions, e.g., in response to a detected event such as engine ignition or a key-on event. Execution of the instructions by the processor causes the processor to calculate the respective slopes of different sets of measured line pressure values measured by the sensor.

In executing the instructions, the controller calculates a ratio of the slopes, and then compares the calculated slope ratio to a calibrated ratio threshold. Above the calibrated ratio threshold, e.g., above about 4:1 in one possible embodiment, the controller performs a local maximizing function to identify the point in time coinciding with the maximum slope ratio. The controller then determines the point of intersection of a pair of lines representing the slopes at this maximum slope ratio. The corresponding line pressure reading at the intersection point is recorded as an interpolated pre-charge pressure value. This value may be considered as a raw value in some embodiments, and thus filtered as needed before recording the filtered value in memory as the interpolated pre-charge pressure.

The controller is also configured to execute a suitable control action with respect to the pump and/or the accumulator using the recorded actual pre-charge pressure. For example, whenever the interpolated pre-charge pressure drops below a calibrated pressure threshold, the controller may simply record a diagnostic code signaling for a repair or replacement of the accumulator piston seal, and/or the controller may automatically modify a control parameter of the pump to change the fluid output or on/off cycling frequency of the pump.

A method includes measuring, via a pressure sensor, a first set and a second set of pressure values, e.g., oldest and most recently recorded values, in a fluid circuit having a pump and a hydraulic accumulator. The method also includes calculating the respective slopes of the first and second sets using a controller that is in communication with the sensor, and calculating a ratio of the slopes. The calculated slope ratio is then compared to a ratio threshold. An interpolated pre-charge pressure is recorded as the pressure corresponding to a point of intersection of a pair of lines representing the respective slopes when the ratio exceeds the threshold. The method further includes executing a control action via the controller with respect to at least one of the pump and the accumulator when the pre-charge pressure drops below a calibrated pressure threshold.

The above features and advantages and other features and advantages of the present invention are readily apparent from the following detailed description of the best modes for carrying out the invention when taken in connection with the accompanying drawings.

DETAILED DESCRIPTION

Figure 1:
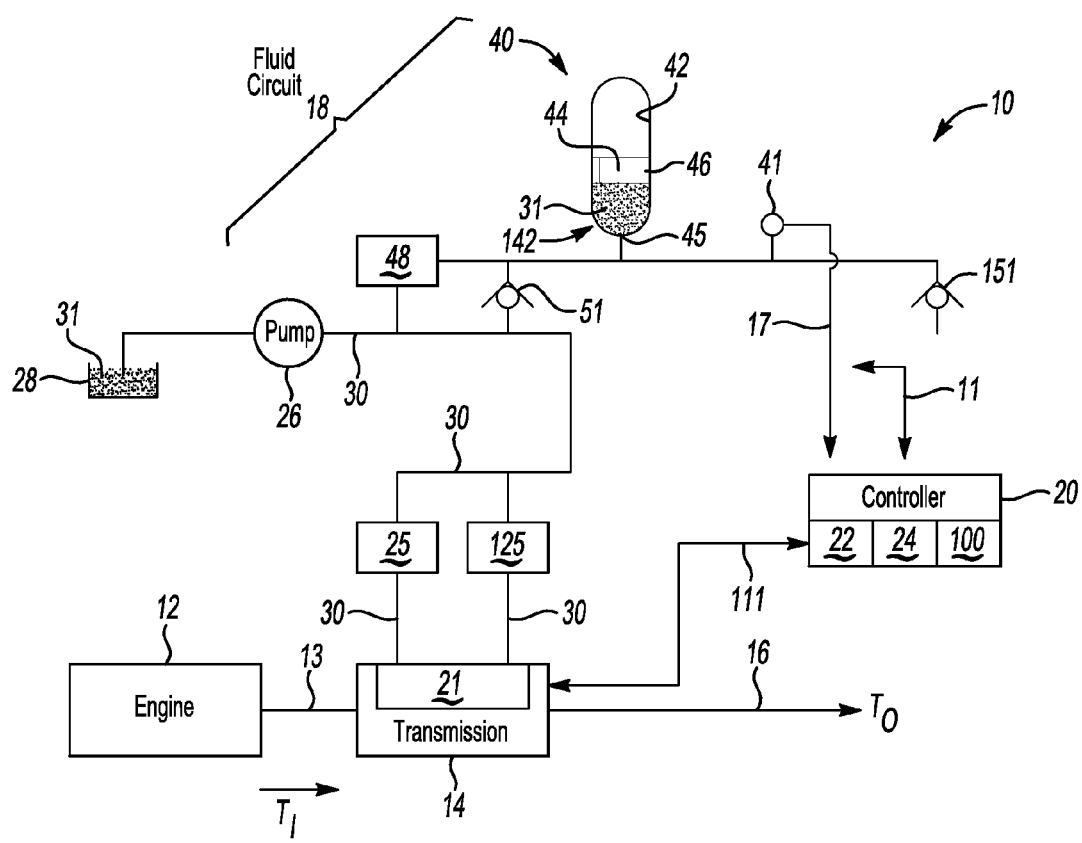
FIG. 1 is a schematic illustration of an example system in the form of a vehicle, with the vehicle having a hydraulic fluid circuit and a controller configured for determining a pre-charge pressure of an accumulator used within the fluid circuit.

Referring to the drawings wherein like reference numbers correspond to like or similar components throughout the several figures, a system 10 is shown in FIG. 1. The system 10 includes a fluid circuit 18 having a pump 26 and a hydraulic accumulator 40. While a vehicle will be used for illustrative purposes hereinafter, any system 10 having a similar pump and accumulator may be used without departing from the intended inventive scope. For example, the system 10 may be a manufacturing system which circulates fluid under pressure to power such devices as hydraulic presses and lifts.

The system 10 includes a controller 20. The controller 20 is in electrical communication with various components of the system 10, as indicated by double headed arrows 11 (to and from circuit 18) and 111 (to and from a transmission 14). In the non-limiting vehicle embodiment of FIG. 1, the fluid circuit 18 is in fluid communication with a transmission 14. The transmission 14 may be driven by an internal combustion engine 12 or any other prime mover such as an electric motor. The engine 12 delivers input torque (arrow $T_I$) to the transmission 14 via an input member 13. An output member 16 of the transmission 14 delivers output torque (arrow $T_O$) to a set of drive wheels (not shown) to propel the vehicle. The transmission 14 may include fluid power components 21 such as valves, pistons, clutch packs, and the like. The fluid circuit 18 is configured to circulate fluid under pressure to the various components 21 as needed.

A check valve 51 may be used in conjunction with a bypass valve 48 for bypass control of the accumulator 40, while another check valve 151 may be used as a relief valve. Other valves may be used to provide the required level of fluid control in the fluid circuit 18. The pump 26 draws oil 31 or another suitable fluid from a sump 28 and circulates the oil 31 to the accumulator 40. The pump 26 may also circulate oil 31 to the transmission 14 for use by the components 21 when the system 10 is configured as a vehicle as shown. Oil 31 is thus circulated through various fluid passages 30 of the fluid circuit 18 to the accumulator 40, the transmission 14, and possibly additional fluid components 25 and 125 such as flow and/or pressure control valves.

The accumulator 40 of FIG. 1 may be a generally cylindrical hydro-pneumatic accumulator of the type known in the art, or any other accumulator design having a piston 44 with a piston seal 46. The piston seal 46 may be constructed of a suitable elastomeric material which slides along an inner wall 42 of the accumulator as the piston 44 moves therein. As the fluid passages 30 fill with oil 31, the piston 44 remains firmly seated and the accumulator 40 remains empty. More precisely, the accumulator 40 remains charged by a volume of inert gas such as nitrogen.

At equilibrium the gas pressure in the accumulator 40 is equal to the fluid pressure in the rest of the fluid circuit 18. As pressure in the fluid circuit 18 rises above this equilibrium point, the seal drag of the piston seal 46 against the inner wall 42 is overcome. The piston 44 begins to move within the accumulator 40. Oil 31 begins to fill a lower chamber 142 defined by the inner wall 42 between the piston 44 and the fluid inlet 45 to the accumulator 40. The volume of oil 31 held in the lower chamber 142 can be determined as a function of pre-charge pressure, i.e., the pressure at a point of inflection of the piston 44 when seal drag is first overcome, with zero fluid volume in the accumulator 40 at the pre-charge pressure point.

As noted above, as the accumulator 40 and piston seal 46 ages, this value can change, and thus the precise volume of the accumulator 40 may begin to vary from its calibrated/new initial value. That is, a new accumulator generally has a known pre-charge pressure. However, over time the piston seal 46 degrades, and as a result the charging gas in the accumulator 40 may leak out. This changes the pre-charge pressure. The present invention is directed to accurately determine this pressure even as it changes over time.

Still referring to FIG. 1, a pressure sensor 41, e.g., a transducer, is positioned in the fluid circuit 18, for instance adjacent to the fluid inlet 45. The sensor 41 measures line pressure in the fluid circuit 18. Pressure readings (arrow 17) from the sensor 41 are transmitted to the controller 20 and thereafter recorded by the controller 20. The controller 20 uses the pressure readings (arrow 17) to interpolate the pre-charge pressure of the accumulator 40 using the present method 100, as well as to control the fluid circuit 18 as needed in response to the changing pre-charge pressure. For instance, once the accurate pre-charge pressure has been determined, the controller 20 can calculate the volume of oil 31 contained within the accumulator 40 at any subsequent point in time. If needed, the controller 20 can also change certain operating parameters of the pump 26, for instance pump speed, and/or record a diagnostic code indicating repair or replacement of the accumulator 40 and/or the piston seal 46, etc.

The controller 20 is configured to store and access process instructions embodying the present method 100, an example embodiment of which is described below with reference to FIG. 4. The controller 20 may include a processor/CPU 22 and memory 24, at least some of which is tangible/non-transitory. The memory 24 may include sufficient read only memory (ROM), random access memory (RAM), electrically-programmable read-only memory (EPROM), flash memory, etc., and any required circuitry including but not limited to a high-speed clock (not shown), analog-to-digital (A/D) circuitry, digital-to-analog (D/A) circuitry, a digital signal processor (DSP), and the necessary input/output (I/O) devices and other signal conditioning and/or buffer circuitry. The controller 20 executes process instructions embodying the present method 100 from tangible, non-transitory computer-readable memory or medium of memory 24.

Figure 2:
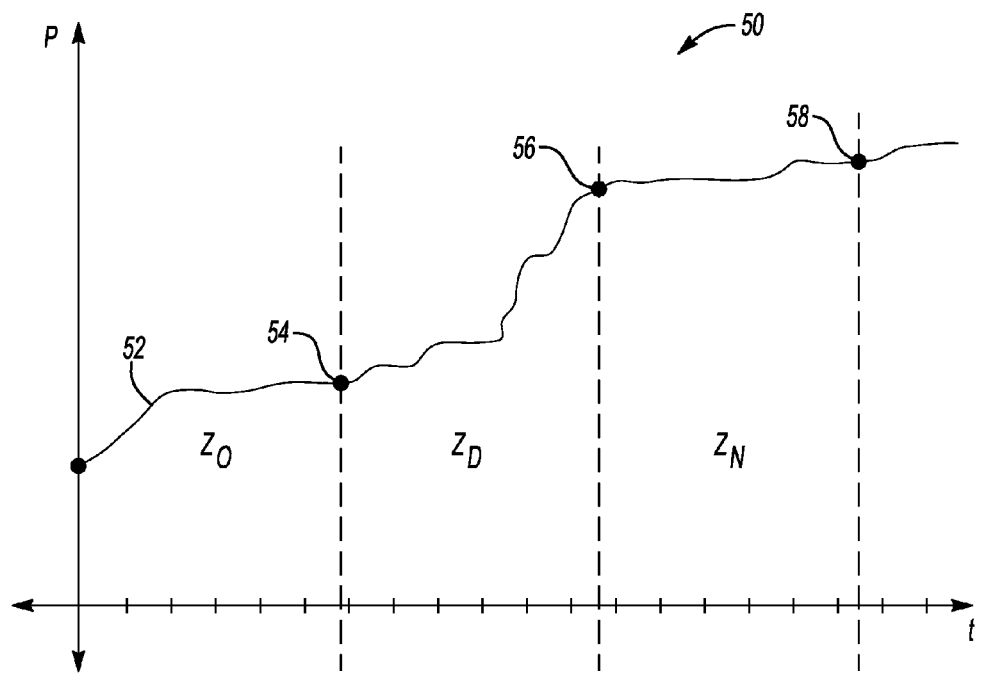
FIG. 2 is an example time plot of measured fluid pressure values that can be used to interpolate an accumulator pre-charge pressure within the fluid circuit shown in FIG. 1.

Referring to FIG. 2, an example time plot 50 includes a trace 52. The trace 52 describes the changing pressure (P), which is plotted on the vertical axis versus time (t) on the horizontal axis of a set of pressure readings. These readings are represented as the pressure readings (arrow 17) received from the sensor 41 shown in FIG. 1. A ring buffer or a sliding array of an allocated size may be used to record samples from the received line pressure readings, e.g., recording every 10 ms or using any other suitable sampling frequency.

In a non-limiting example embodiment, the ring buffer/array may be divided into three different partition zones corresponding to the oldest, newest, and intermediate term pressure readings. For clarity, the partition zone holding the newest readings is labeled $Z_N$ in FIG. 2, with zone $Z_N$ beginning at point 56 and terminating at point 58. The partition zone holding the oldest readings is labeled $Z_O$, starts at the origin (O), and terminates at point 54. The remaining zone of intermediate readings is labeled $Z_D$, i.e., "dead zone", and lies between points 54 and 56 of trace 52. The values in the dead zone ($Z_D$) are "dead" in the sense that they are not used in interpolating the pre-charge pressure of the accumulator 40 of FIG. 1. At some point, these dead zone values become the oldest values, and are used at that point in the interpolation.

As is well understood in the art, a ring buffer or sliding array of an allocated size (n), e.g., 10 indexes, receives and records new values in each index of 1 through n in a string of data samples. When the last index of the ring buffer/array is full, the next reading is recorded in the first index of the array, thus overwriting data that was previously recorded in that particular index. For a non-limiting example of 10 pressure readings (i.e., n=10), one may partition the 10 indexes into three different partition zones or windows of, for instance, sizes 3, 4, and 3, respectively. The sizes of the arrays may change depending on the system in which the controller 20 is employed without departing from the intended inventive scope.

Figure 3:
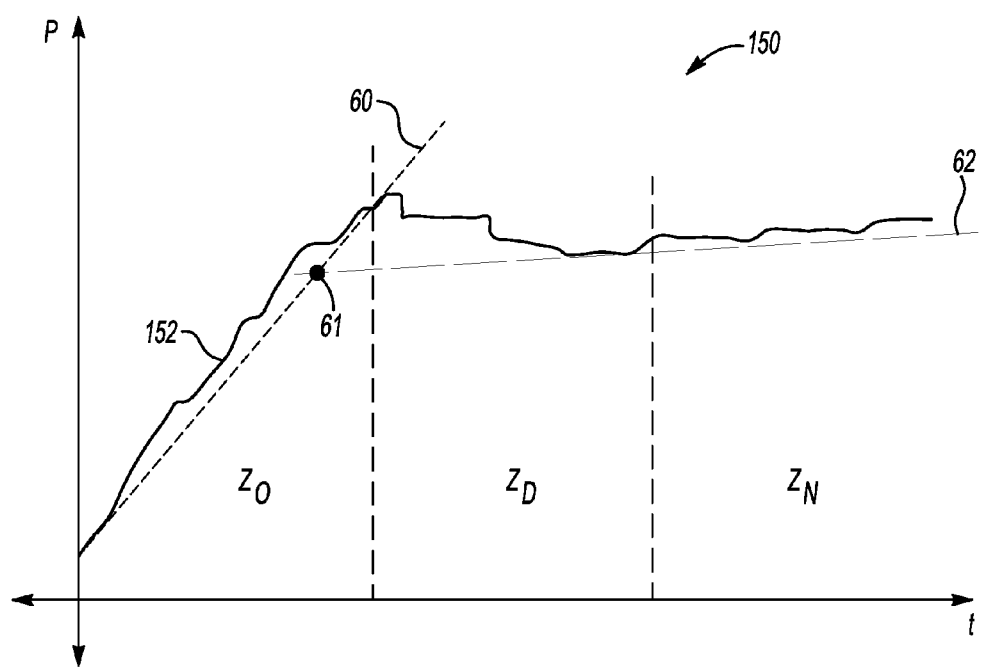
FIG. 3 is another example time plot of recorded pressure values demarcated by intersecting slope lines to indicate values used in a ring buffer/array as set forth herein.

Referring to FIG. 3, an example time plot 150 includes another trace 152, with the trace 152 divided into three different partition zones $Z_O$, $Z_D$, and $Z_N$ as explained above. The controller 20 of FIG. 1 calculates the slope of the partition zone ($Z_N$), i.e., the newest recorded pressure readings, and the slope of the partition zone ($Z_O$), i.e., the oldest recorded pressure readings in the array. These slopes are represented by lines 60 and 62 in FIG. 3. The lines 60 and 62 intersect at a point 61, which will change along with the slope of lines 60 and 62 as new pressure readings continue to be received and recorded.

Once certain slope criteria are met which indicate that the inflection point has been reached in the accumulator 40, i.e., seal drag is overcome and the piston 44 of FIG. 1 has begun to move, the controller 20 of the same Figure finds and records the pressure corresponding to the intersection point occurring at a maximum or peak value. This pressure is treated as being the initial/raw pre-charge pressure. In the presence of a new piston seal 46 (see FIG. 1) the seal drag may be high, thus producing a sharp peak in trace 152. Over time, the seal 46 wears and the inflection point as it appears in trace 152 may not be easily identifiable. The present approach may help accurately determine the inflection point and ultimately the pre-charge pressure even as the piston seal 46 degrades.

Figure 4:
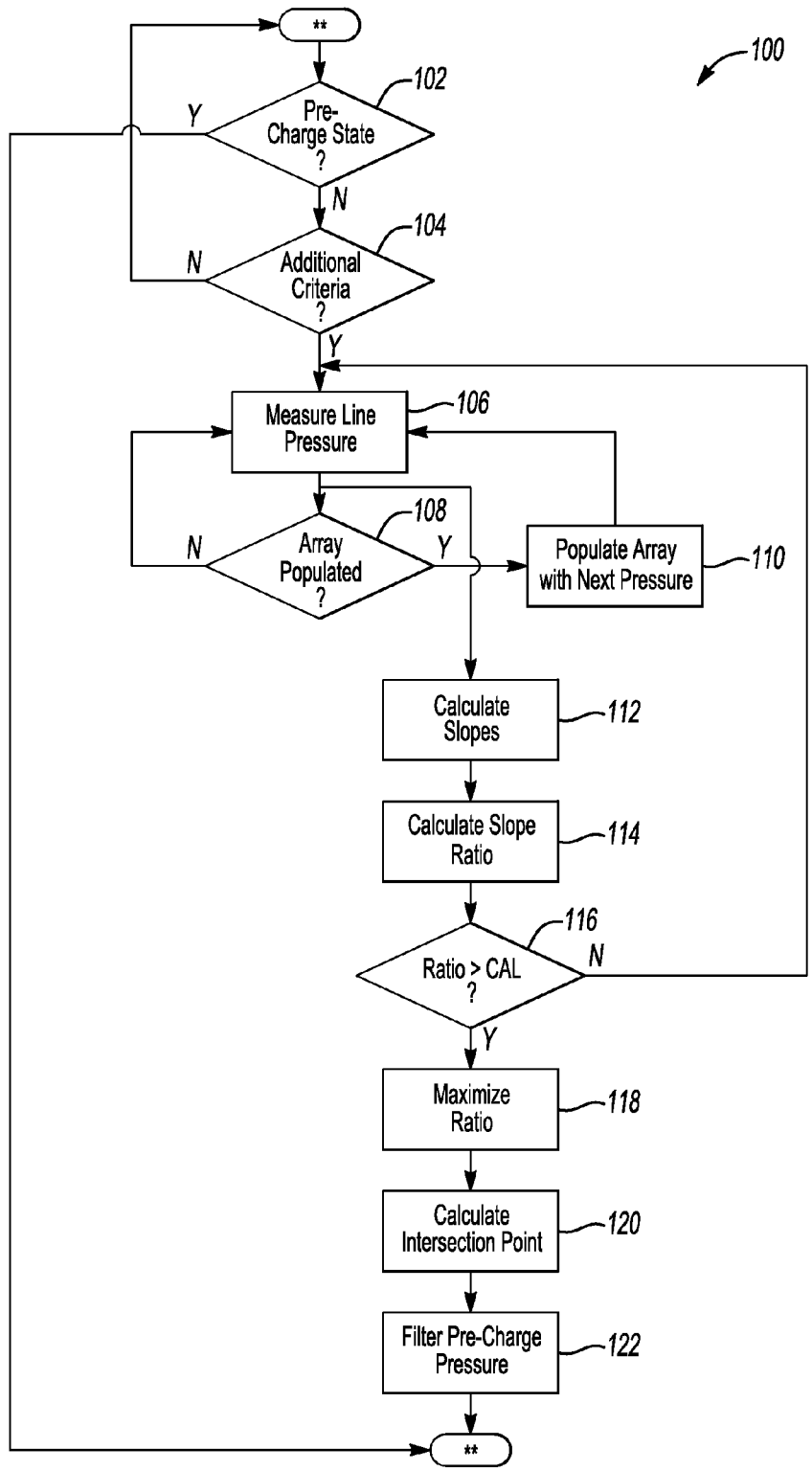
FIG. 4 is a flow chart describing an example method for determining the pre-charge pressure of a hydraulic accumulator in a fluidic system such as the vehicle of FIG. 1.

Referring to FIG. 4 in conjunction with the structure of FIG. 1, an example method 100 is shown for determining the pre-charge pressure of the accumulator 40. Steps 102 and 104 are executed to verify that certain conditions are satisfied before proceeding with the remaining steps. When used aboard a vehicle, step 102 may entail verifying that a pre-charge state has not already been achieved in the present key cycle. The controller 20 executes step 104 only if a pre-charge state has not yet been achieved, with the method 100 otherwise exiting, as indicated by "**". In other systems, similar criteria may be used to determine when and when not to proceed with the present method 100.

At step 104, the controller 20 may verify additional criteria, e.g., whether a timer has counted through a calibrated duration and thus elapsed, and/or whether a minimum pressure is present in the fluid circuit 18. These or other suitable conditions can be used to ensure that low-lying noise or pressure pulsations are not erroneously detected. If the timer elapses and pre-charge is not detected, the controller 20 may temporarily stop looking for the pre-charge pressure for that particular key cycle. The method 100 may return to start (*) and reinitiate when such criteria have not been met, or it may proceed to step 106 when the criteria have been satisfied.

At step 106, the pressure sensor 41 measures the line pressure in the fluid circuit 18 and relays these values as pressure readings (arrow 17) to the controller 20. The controller 20 in turn records the values in a ring buffer or sliding array of memory 24 as explained above. Step 106 may include incrementing an array index in the ring buffer/array as each element or index of the array is populated with a corresponding pressure reading from sensor 41. The method 100 then proceeds simultaneously to steps 108 and 112.

At step 108, the controller 20 determines whether the last array in the ring buffer has been populated with data. If the array has been populated, the method 100 proceeds to step 110. The method 100 otherwise proceeds to step 112.

At step 110, having determined at step 108 that the buffer/array is full, the controller 20 then populates the first element of the ring buffer/array with the next received pressure reading. Steps 106, 108, and 110 continue to be executed in a loop through the duration of the method 100, with the remaining steps using the data that is contained in the ring array. In other words, the profile of trace 52 of FIG. 2 and trace 152 of FIG. 3 changes as each new reading updates the buffer/array.

At step 112, the controller 20 calculates the slopes of the newest and oldest data in respective partition zones $Z_N$ and $Z_O$ shown in FIGS. 2 and 3. The method 100 proceeds to step 114 once the slopes have been recorded.

At step 114, the controller 20 of FIG. 1 calculates the ratio of the slopes from step 106. This value is likewise recorded in memory 24. The method 100 then proceeds to step 116.

At step 116, the controller 20 compares the calculated slope ratio from step 114 to calibrated ratio threshold, e.g., 4:1 in one possible embodiment. The ratio used as the calibration value should correspond to slopes approaching a perpendicular orientation. The method 100 repeats step 106 if the calculated ratio is less than the calibrated ratio threshold. However, if the calculated ratio exceeds the calibrated ratio threshold, the method 100 proceeds instead to step 118.

The controller 20 maximizes the calculated ratio at step 118. In other words, once step 116 has determined that the calculated ratio exceeds the calibrated ratio threshold, the controller 20 begins to look for a peak or maximum value indicating that the pressure readings have peaked, e.g., using a maximization function. For instance, the example trace 152 of FIG. 3 shows a clear peak some time after point 61, followed by a clear decrease in pressure. Assuming for the sake of illustration that point 61 corresponds to the slopes of lines 60 and 62 first exceeding the calibrated ratio threshold, the controller 20 could then perform a maximization function on the values recorded after passing the calibrated ratio threshold. This further isolates and identifies the maximum ratio in the time period after the threshold is reached. Using another example, if the calculated ratio passes a threshold ratio of 4:1, reaches a maximum of 5:1, then retreats again toward and below 4:1, then the 5:1 ratio is treated as the maximum ratio. Once identified, the method 100 proceeds to step 120.

At step 120 the controller calculates the intersection point of the line that bisects the data points in the newest partition zone ($Z_N$) and the oldest partition zone ($Z_O$), both of which are shown in FIGS. 2 and 3. The corresponding pressure reading is temporarily recorded as a preliminary pre-charge pressure value in memory 24 before the method 100 proceeds to step 122.

At step 122, the controller 20 may optionally filter the recorded preliminary pre-charge pressure value to account for signal noise rather than treating the recorded value as being a true representation of the actual pre-charge value. For example, assuming a first preliminary pre-charge pressure value ($P_1$) is recorded the first time through the method 100. On the next pass, a second preliminary pre-charge pressure value ($P_2$) is determined. This value may be filtered in some way, such as using a Kalman filter, using a rolling average, using a weighting function which assigns greater weight to the n prior recorded values than to the most currently recorded value of n+1, etc. In this manner, outliers or errant data points do not unduly affect the control of the fluid circuit 18. Instead, trends must develop to have an appreciable effect on the actual pre-charge pressure.

While the best modes for carrying out the invention have been described in detail, those familiar with the art to which this invention relates will recognize various alternative designs and embodiments for practicing the invention within the scope of the appended claims.

The invention claimed is:

1. A system comprising:
a hydraulic fluid pump providing hydraulic fluid at line pressure to a fluid pressure powered component;
a piston having a seal;
a hydraulic accumulator in fluid communication with the hydraulic fluid pump and the fluid pressure powered component, and containing the piston and the seal, wherein the hydraulic fluid pump is configured to selectively feed some of the hydraulic fluid to the hydraulic accumulator to thereby charge the hydraulic accumulator;
a pressure sensor positioned with respect to the hydraulic accumulator that measures the line pressure; and
a controller in electrical communication with the pressure sensor, wherein the controller is configured to:
calculate respective slopes of a first set and a second set of measured pressure values as communicated to the controller by the pressure sensor;
calculate a ratio of the respective slopes;
compare the calculated ratio of the respective slopes to a ratio threshold;
record a pre-charge pressure as a pressure value corresponding to a point of intersection of a pair of lines representing the respective slopes when the calculated ratio exceeds the ratio threshold, wherein the recorded pre-charge pressure corresponds to a point of inflection of the piston within the hydraulic accumulator at which drag from the seal is first overcome when none of the hydraulic fluid is contained in the hydraulic accumulator; and
execute a control action with respect to at least one of the hydraulic fluid pump and the hydraulic accumulator when the recorded pre-charge pressure is less than a calibrated minimum threshold.

2. The system of claim 1, further comprising a transmission in fluid communication with the hydraulic fluid pump, wherein the fluid pressure powered component is part of the transmission.

3. The system of claim 1, wherein the controller records the received pressure readings in a ring buffer or sliding array.

4. The system of claim 3, wherein the controller is configured for calculating the ratio in part using the recorded pressure values from the ring buffer or sliding array corresponding to a set of oldest and a set of most recently recorded pressure values.

5. The system of claim 4, wherein the ring buffer or sliding array has a calibrated number of indexes and is divided into a first, a second, and a third partition, and wherein the controller assigns the oldest and the most recently recorded pressure readings to corresponding indexes in the respective first and third partitions.

6. The system of claim 1, wherein the controller filters the value of the pre-charge pressure using a Kalman filter.

7. The system of claim 1, wherein the controller filters the value of the pre-charge pressure using one of a rolling average and a weighted average of a calibrated number of previously-recorded pre-charge pressures.

8. The system of claim 1, wherein the control action includes modifying one of the cycling frequency and the speed of the hydraulic fluid pump.

9. A method comprising:
measuring, via a pressure sensor, a first set and a second set of pressure values in a fluid circuit having a hydraulic fluid pump and a hydraulic accumulator, wherein the hydraulic accumulator includes a piston and a seal, and wherein the hydraulic accumulator is selectively charged via an admission of hydraulic fluid circulated via the hydraulic fluid pump;
calculating the respective slopes of the first and second sets of pressure values using a controller that is in electrical communication with the pressure sensor;
calculating a ratio of the respective slopes;
comparing the calculated ratio of the respective slopes to a ratio threshold;
recording a point of intersection of a pair of lines representing the slopes as a calculated pre-charge pressure value when the ratio exceeds the threshold, wherein the calculated pre-charge pressure corresponds to a point of inflection of the piston within the hydraulic accumulator at which drag from the seal is first overcome when none of the hydraulic fluid is contained in the hydraulic accumulator; and
executing a control action, via the controller, with respect to at least one of the hydraulic fluid pump and the accumulator when the calculated pre-charge pressure drops below a calibrated pressure threshold.

10. The method of claim 9, further comprising: supplying fluid pressure to a fluid pressure powered component of a vehicle transmission via the hydraulic accumulator.

11. The method of claim 9, further comprising: recording the received pressure readings in a ring buffer or sliding array.

12. The method of claim 11, further comprising:
dividing a fixed number of indexes of the ring buffer or sliding array into three time-sequential partitions; and
assigning the most recently received and oldest pressure readings from the sensor to the respective first and last partitions.

13. The method of claim 9, further comprising:
filtering the value of the calculated pre-charge pressure as a function of at least one previously calculated pre-charge pressure.

14. The method of claim 9, further comprising modifying an operating parameter of the hydraulic fluid pump when the calculated pre-charge pressure is below a minimum threshold.

15. A vehicle comprising:
a transmission having a fluid pressure powered component;
a hydraulic fluid pump in fluid communication with the fluid pressure powered component, and operable to circulate hydraulic fluid;
a hydraulic accumulator having an inlet and containing a piston and a seal, wherein the hydraulic accumulator is in fluid communication with the hydraulic fluid pump, wherein the hydraulic fluid pump is configured to selectively feed some of the hydraulic fluid to the hydraulic accumulator to thereby charge the hydraulic accumulator;
a pressure sensor positioned configured to measure line pressure in a fluid circuit in proximity to the inlet of the hydraulic accumulator; and
a controller in electrical communication with the pressure sensor, wherein the controller:
receives measured pressure values from the pressure sensor;
records the measured pressure values in a ring buffer having designated partitions corresponding to the most recently recorded and oldest recorded pressure values;
calculates the respective slopes of the most recently recorded and oldest recorded pressure values;
calculates a ratio of the respective slopes;
compares the calculated ratio of the respective slopes to a ratio threshold of greater than about 4:1;

records a calculated pre-charge pressure value as the point of intersection of a pair of lines representing the respective slopes only when the ratio exceeds the ratio threshold, wherein the calculated pre-charge pressure corresponds to a point of inflection of the piston within the hydraulic accumulator at which drag from the seal is first overcome when none of the hydraulic fluid is contained in the hydraulic accumulator;

filters the value of the calculated pre-charge pressure as a function of at least one previously calculated pre-charge pressure; and modifies an operating parameter of the pump when the calculated pre-charge pressure drops below a calibrated minimum threshold.

16. The vehicle of claim 15, wherein the controller filters the value using at least one of a Kalman filter, a rolling average, and a weighted average.

17. The vehicle of claim 15, wherein operating parameter of the hydraulic fluid pump includes one of a speed and a cycling frequency of the hydraulic fluid pump.

* * * * *